United States Patent
Kuppa et al.

(10) Patent No.: US 11,178,170 B2
(45) Date of Patent: Nov. 16, 2021

(54) SYSTEMS AND METHODS FOR DETECTING ANOMALOUS BEHAVIOR WITHIN COMPUTING SESSIONS

(71) Applicant: CA, INC., San Jose, CA (US)

(72) Inventors: Aditya Kuppa, Dublin (IE); Slawomir Grzonkowski, Dublin (IE); Sidharth Pipriya, Dublin (IE)

(73) Assignee: CA, Inc., San Jose, CA (US)

( * ) Notice: Subject to any disclaimer, the term of this patent is extended or adjusted under 35 U.S.C. 154(b) by 480 days.

(21) Appl. No.: 16/260,776

(22) Filed: Jan. 29, 2019

(65) Prior Publication Data
US 2020/0195683 A1 Jun. 18, 2020

(30) Foreign Application Priority Data
Dec. 14, 2018 (IN) .............................. 201811047432

(51) Int. Cl.
| | | |
|---|---|---|
| *H04L 29/06* | (2006.01) | |
| *G06F 9/54* | (2006.01) | |
| *G06N 20/00* | (2019.01) | |
| *G06N 7/00* | (2006.01) | |

(52) U.S. Cl.
CPC .......... *H04L 63/1441* (2013.01); *G06F 9/542* (2013.01); *G06N 7/005* (2013.01); *G06N 20/00* (2019.01); *H04L 63/1416* (2013.01); *H04L 63/1425* (2013.01); *H04L 63/20* (2013.01)

(58) Field of Classification Search
CPC .............. H04L 63/1441; H04L 63/1416; H04L 63/1425; H04L 63/20; G06N 20/00; G06N 7/005; G06F 9/542
See application file for complete search history.

(56) References Cited

U.S. PATENT DOCUMENTS

| | | | | |
|---|---|---|---|---|
| 10,248,533 | B1* | 4/2019 | Shah | G06N 20/20 |
| 11,025,649 | B1* | 6/2021 | Bilge | G06N 20/00 |
| 2019/0138938 | A1* | 5/2019 | Vasseur | H04L 41/147 |
| 2019/0266325 | A1* | 8/2019 | Scherman | G06F 21/562 |

(Continued)

OTHER PUBLICATIONS

Hutchins et al., "Intelligence-Driven Computer Network Defense Informed by Analysis of Adversary Campaigns and Intrusion Kill Chains", Information Warfare& Security Research, Jan. 2011, pp. 1-14.

(Continued)

*Primary Examiner* — Hee K Song
(74) *Attorney, Agent, or Firm* — Foley & Lardner LLP

(57) ABSTRACT

The disclosed computer-implemented method for detecting anomalous behavior within computing sessions may include (i) identifying, by the computing device, a set of execution events that correspond to a computing session, (ii) providing, by the computing device, the set of execution events as input to an autoencoder, (iii) receiving, by the computing device and from the autoencoder, a reconstruction error associated with autoencoding the set of execution events, (iv) detecting, by the computing device and based on the reconstruction error, an anomaly within the computing session, and (v) performing, by the computing device, a security action to address the anomaly within the computing session. Various other methods, systems, and computer-readable media are also disclosed.

20 Claims, 9 Drawing Sheets

(56) References Cited

U.S. PATENT DOCUMENTS

2019/0286506 A1\* 9/2019 Cheng ............... G06N 3/088
2020/0349470 A1\* 11/2020 Ikeda ............... G06N 3/088

OTHER PUBLICATIONS

Dhamija et al., "Why Phishing Works", Proceedings of the SIGCHI Conference on Human Factors in Computing Systems, Apr. 22-27, 2006, 10 pages.

Zhang et al., "ARROW: GenerAting SignatuRes to Detect DRive-By DOWnloads", Proceedings of the 20th International Conference on World Wide Web, March 28-Apr. 1, 2011, 10 pages.

Wueest et al., "Living of the land and fileless attack techniques—An ISTR Special Report", URL: https://www.symantec.com/content/dam/symantec/docs/security-center/white-papers/istr-living-off-the-land-and-fileless-attack-techniques-en.Pdf, Jul. 2007, 30 pages.

Muandet et al., "One-class support measure machines for group anomaly detection", Conference on Uncertainty in Artificial Intelligence, 2013, 10 pages.

Xiong et al., "Group anomaly detection using flexible genre models", Proceedings of the 24th International Conference on Neural Information Processing Systems, Dec. 12-15, 2011, pp. 1-9.

Soleimani et al., "ATD: Anomalous Topic Discovery in High Dimensional Discrete Data", IEEE Transactions on Knowledge and Data Engineering, vol. 28, No. 9, Sep. 1, 2016, pp. 1-14.

Yu et al., "GLAD: Group Anomaly Detection in Social Media Analysis", Proceedings of the 20th ACM SIGKDD International Conference on Knowledge Discovery and Data Mining, Aug. 24-27, 2014, pp. 372-381.

Hodge et al., "A Survey of Outlier Detection Methodologies", Artificial Intelligence Review, vol. 22, No. 2, 2004, pp. 1-43.

Davis et al., "The Relationship Between Precision-Recall and ROC Curves", Proceedings of the 23rd International Conference on Machine Learning (ICML), 2006, 8 pages.

Kingma et al., "ADAM: A Method for Stochastic Optimization", Jan. 30, 2017, pp. 1-15.

Kiran et al., "An overview of deep learning based methods for unsupervised and semi-supervised anomaly detection in videos", 2018, pp. 1-15.

Makhzani et al., "Adversarial Autoencoders", May 25, 2016, pp. 1-16.

Chalapathy et al., "Anomaly Detection using Deep Generative Models", Apr. 13, 2018, pp. 1-16.

Denning, Dorothy E., "An Intrusion-Detection Model", IEEE Transactions on Software Engineering, vol. SE-13, No. 2, Feb. 1987, pp. 222-231.

Lane et al., "Sequence Matching and Learning in Anomaly Detection for Computer Security", AAAI Technical Report, 1997, pp. 43-49.

Lane et al., "Temporal Sequence Learning and Data Reduction for Anomaly Detection", ACM Transactions on Information and System Security, vol. 2, No. 3, Aug. 1999, pp. 295-331.

Lunt et al., "A Prototype Real-Time Intrusion-Detection Expert System", Proceedings of the IEEE Symposium on Security and Privacy, Apr. 18-21, 1988, pp. 59-66.

Domingos, Pedro, "Rule Induction and Instance-Based Learning A Unified Approach", Proceedings of the 14th International Joint Conference on Artificial Intelligence, vol. 2, 1995, pp. 1226-1232.

Xu et al., "A Reinforcement Learning Approach for Host based Intrusion Detection Using Sequences of System Calls", Proceedings of the International Conference on Advances in Intelligent Computing, Part 1, 2005, pp. 995-1003.

Marian et al., "Fmeter: Extracting Indexable Low-level System Signatures by Counting Kernel Function Calls", Proceedings of the 13th International Middleware Conference, 2012, pp. 1-20.

Tran et al., "An Approach for Host-Based Intrusion Detection System Design Using Convolutional Neural Network", Mobile Networks and Management—Proceedings of the 9th International Conference, Dec. 13-15, 2017, pp. 116-126.

Qu et al., "An Intrusion Detection Model Based on Deep Belief Network", Proceedings of the VI International Conference on Network, Communication and Computing, Dec. 8-10, 2017, pp. 97-101.

Du et al., "DeepLog: Anomaly Detection and Diagnosis from System Logs through Deep Learning", Proceedings of the ACM SIGSAC Conference on Computer and Communications Security, Oct. 30-Nov. 3, 2017, 14 pages.

Brown et al., "Recurrent Neural Network Attention Mechanisms for Interpretable System Log Anomaly Detection", Proceedings of the First Workshop on Machine Learning for Computing Systems, Mar. 13, 2018, 8 pages.

Zhou et al., "Anomaly Detection with Robust Deep Autoencoders", Proceedings of the 23rd ACM SIGKDD International Conference on Knowledge Discovery and Data Mining, Aug. 13-17, 2017, pp. 665-674.

Huber et al., "Robust Statistics", Wiley, Second Edition, 2009, 361 pages.

Yang et al., "Towards K-means-friendly Spaces: Simultaneous Deep Learning and Clustering", Proceedings of the 34th International Conference on Machine Learning, Jun. 13, 2017, 14 pages.

Yu et al., "A Survey on Social Media Anomaly Detection", ACM SIGKDD Explorations Newsletter, vol. 18, No. 1, 2016, pp. 1-24.

Zhai et al., "Deep Structured Energy Based Models for Anomaly Detection", Proceedings of the 33rd International Conference on International Conference on Machine Learning, vol. 48, Jun. 16, 2016, 10 pages.

Debar et al., "Aggregation and Correlation of Intrusion-Detection Alerts", RAID, Springer, 2001, pp. 85-103.

Ning et al., "Learning Attack Strategies from Intrusion Alerts", CCS. ACM, 2003, pp. 1-22.

Noel et al., "Correlating Intrusion Events and Building Attack Scenarios through Attack Graph Distances", ACSAC, IEEE, 2004, 10 pages.

Qin et al., "Statistical Causality Analysis of INFOSEC Alert Data", RAID, Springer, 2003, pp. 73-93.

Wang et al., "A Graph Based Approach Toward Network Forensics Analysis", ACM Transactions on Information and System Security, vol. 12, No. 1, Article 4, Oct. 2008, 33 pages.

Gu et al., "BotHunter: Detecting Malware Infection through IDS-Driven Dialog Correlation", 16th USENIX Security Symposium, 2007, 16 pages.

Pei et al., "HERCULE: Attack Story Reconstruction via Community Discovery on Correlated Log Graph", Proceedings of the 32nd Annual Conference on Computer Security Applications, Dec. 5-9, 2016, 13 pages.

Yen et al., "Beehive: Large-Scale Log Analysis for Detecting Suspicious Activity in Enterprise Networks", Proceedings of International Conference on Dependable Systems and Networks (ACSAC), Dec. 9-13, 2013, 10 pages.

Oprea et al., "Detection of Early-Stage Enterprise Infection by Mining Large-Scale Log Data", Proceedings of International Conference on Dependable Systems and Networks (DSN), Nov. 24, 2014, pp. 1-16.

Schlegl et al., "Unsupervised Anomaly Detection with Generative Adversarial Networks to Guide Marker Discovery", Proceedings of 25th International Conference on Information Processing in Medical Imaging, Jun. 25-30, 2017, 12 pages.

Mikolov et al., "Distributed Representations of Words and Phrases and their Compositionality", Advances in Neural Information Processing Systems, 2013, pp. 1-9.

Pagliardini et al., "Unsupervised Learning of Sentence Embeddings using Compositional n-Gram Features", Dec. 28, 2018, 13 pages.

Strom, Blake, "Adversarial Tactics, Techniques and Common Knowledge", URL: https://attack.mitre.org., Aug. 2015, 17 pages.

Chandola et al., "Anomaly Detection: A survey", ACM Computing Surveys (CSUR), vol. 41, No. 3, Sep. 2009, pp. 1-72.

Liu et al., "Accelerated Local Anomaly Detection via Resolving Attributed Networks", Proceedings of the 26th International Joint Conference on Artificial Intelligence, 2017, 7 pages.

Li et al., "Radar: Residual Analysis for Anomaly Detection in Attributed Networks", Proceedings of the 26th International Joint Conference on Artificial Intelligence, 2017, 7 pages.

(56) References Cited

OTHER PUBLICATIONS

Perozzi et al., "Focused Clustering and Outlier Detection in Large Attributed Graphs", Proceedings of the 20th ACM SIGKDD International Conference on Knowledge Discovery and Data Mining, Aug. 24-27, 2014, 10 pages.

* cited by examiner

SYSTEMS AND METHODS FOR DETECTING ANOMALOUS BEHAVIOR WITHIN COMPUTING SESSIONS

CROSS REFERENCE TO RELATED APPLICATION

This application claims the benefit of Indian Provisional Application No. 201811047432, filed 14 Dec. 2018, the disclosure of which is incorporated, in its entirety, by this reference.

BACKGROUND

Nefarious actors often target conventional software tools and pre-installed system applications to implement attacks on computing devices. For example, some software tools that are readily available on a computer and used for legitimate purposes may be maliciously compromised and used to gather information from a targeted environment, to steal computer credentials and passwords, and to encrypt and ransom computer files. Since these software tools are also used for legitimate purposes, detecting malicious uses of the tools is difficult.

Some conventional detection systems use rules-based policies that compare user behavior to a database of known malicious activity to detect malicious activity. For example, a rules-based system may use partial matching functions to compare commands being used during a user's computing session to commands that have been used in previous attacks to identify similarities. But these systems rely on attackers continually using the same or similar exploitation tactics. The instant disclosure, therefore, identifies and addresses a need for systems and methods for detecting anomalous behavior within computing sessions.

SUMMARY

As will be described in greater detail below, the instant disclosure describes various systems and methods for detecting anomalous behavior within computing sessions.

In one example, a method for detecting anomalous behavior within computing sessions may include (i) identifying, by the computing device, a set of execution events that correspond to a computing session, (ii) providing, by the computing device, the set of execution events as input to an autoencoder, (iii) receiving, by the computing device and from the autoencoder, a reconstruction error associated with autoencoding the set of execution events, (iv) detecting, by the computing device and based on the reconstruction error, an anomaly within the computing session, and (v) performing, by the computing device, a security action to address the anomaly within the computing session.

In some examples, the method may include receiving, from the autoencoder, another reconstruction error associated with autoencoding the set of execution events, detecting, based on the other reconstruction error, another anomaly within the computing session, and grouping the anomalies according to the set of execution events and the computing session. In some examples, the method may also include decoding, by the autoencoder, the autoencoded set of execution events to reconstruct the set of execution events, and comparing, by the autoencoder, the autoencoded set of execution events to the reconstructed set of execution events to determine the reconstruction errors. In some examples, the autoencoder may include an adversarial autoencoder. In some examples, the method may also include updating, by the adversarial autoencoder, weights of a discriminator of the adversarial autoencoder based on the reconstruction errors.

In some examples, the set of execution events may include strings of text from command line executions, and the method may also include extracting n-grams from the text as at least part of the input to the autoencoder. In some examples, the method may also include mapping behaviors of a plurality of software applications to a database of malicious uses of the software applications to form at least a part of the set of execution events.

In one embodiment, a system for detecting anomalous behavior within computing sessions may include at least one physical processor, and physical memory comprising computer-executable instructions that, when executed by the physical processor, cause the physical processor to (i) identify a set of execution events that correspond to a computing session, (ii) provide the set of execution events as input to an autoencoder, (iii) receive, from the autoencoder, a reconstruction error associated with autoencoding the set of execution events, (iv) detect, based on the reconstruction error, an anomaly within the computing session, and (v) perform a security action to address the anomaly within the computing session.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a set of execution events that correspond to a computing session, (ii) provide the set of execution events as input to an autoencoder, (iii) receive, from the autoencoder, a reconstruction error associated with autoencoding the set of execution events, (iv) detect, based on the reconstruction error, an anomaly within the computing session, and (v) perform a security action to address the anomaly within the computing session.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
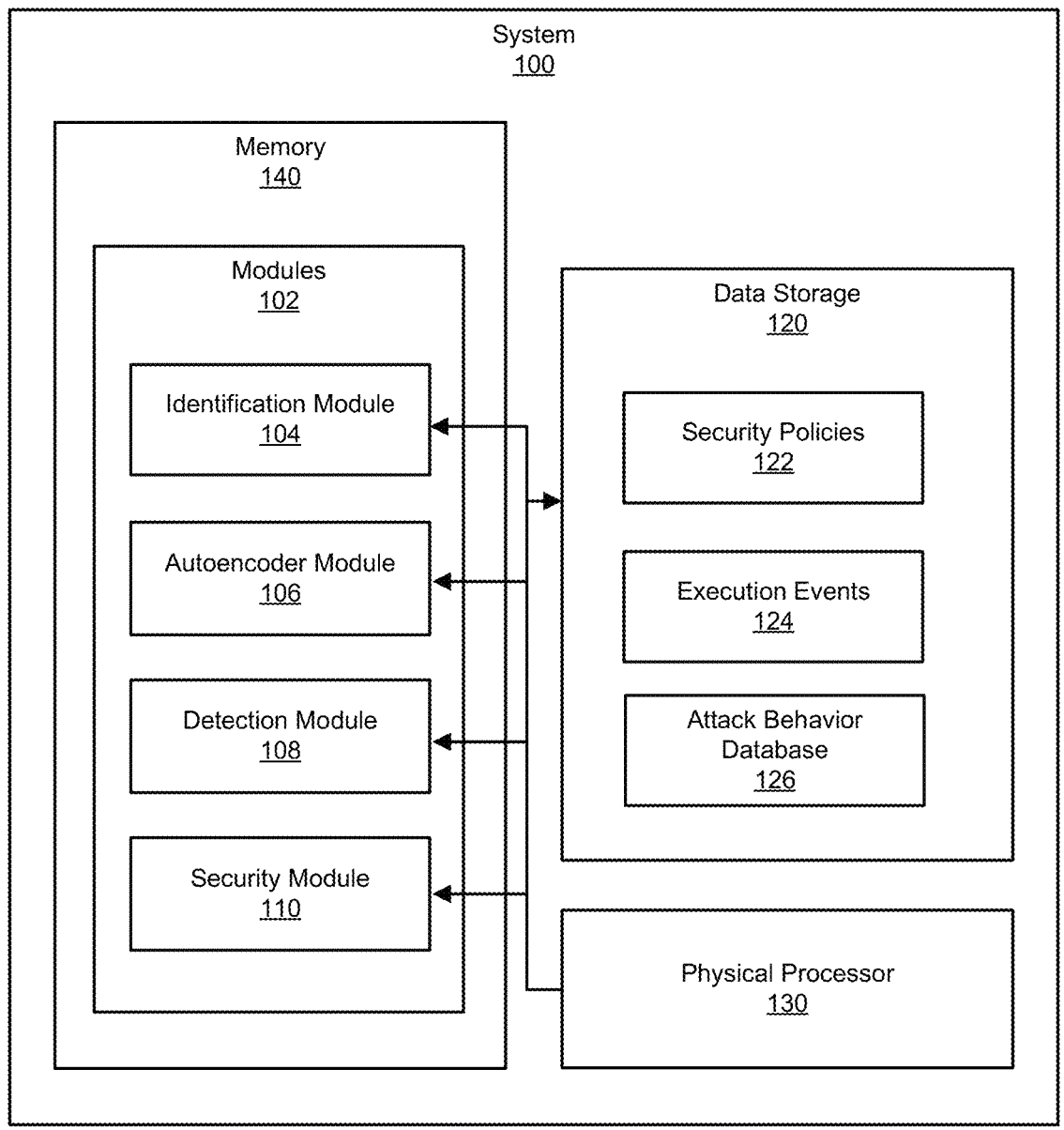
FIG. 1 is a block diagram of an example system for detecting anomalous behavior within computing sessions.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting anomalous behavior within computing sessions. As will be described in greater detail below, a machine learning system may operate on a number of execution events employed by a variety of software tools to identify anomalous uses that fall outside of legitimate uses of the software tools. For example, embodiments of this disclosure may utilize deep generative models, such as adversarial autoencoders, to detect attacker activity that may be difficult to detect using conventional techniques. These models may process various types of events (e.g., registry value changes, processes executed, command lines responsible for activity, windows session IDs, etc.) on endpoint within a set of computing systems (e.g., devices within an enterprise) to find anomalous behaviors that other anti-malware systems may not consider as outliers.

To illustrate, the software tools may employ command line executions that include text strings having a plurality of n-grams (including unigrams). An n-gram is generally a contiguous sequence of "n" number of items from a given sample of text. The system may extract the n-grams of the command line execution text strings to form numerical representations of the strings. The system may also map the command line executions of the software tools to a database of malicious uses of the software tools to build a model of the malicious uses. The system may then input numerical representations of the command line execution text strings during a computing session along with the model to an autoencoder. The autoencoder may encode the input and then decode the encoded input to reconstruct the input and determine an error in the reconstruction. Command lines executions with larger errors may constitute anomalous uses that fall outside legitimate uses of the command line executions. Thus, the system may group the anomalous uses of the command line executions as malicious according to the computing sessions and the reconstruction errors.

Figure 4:
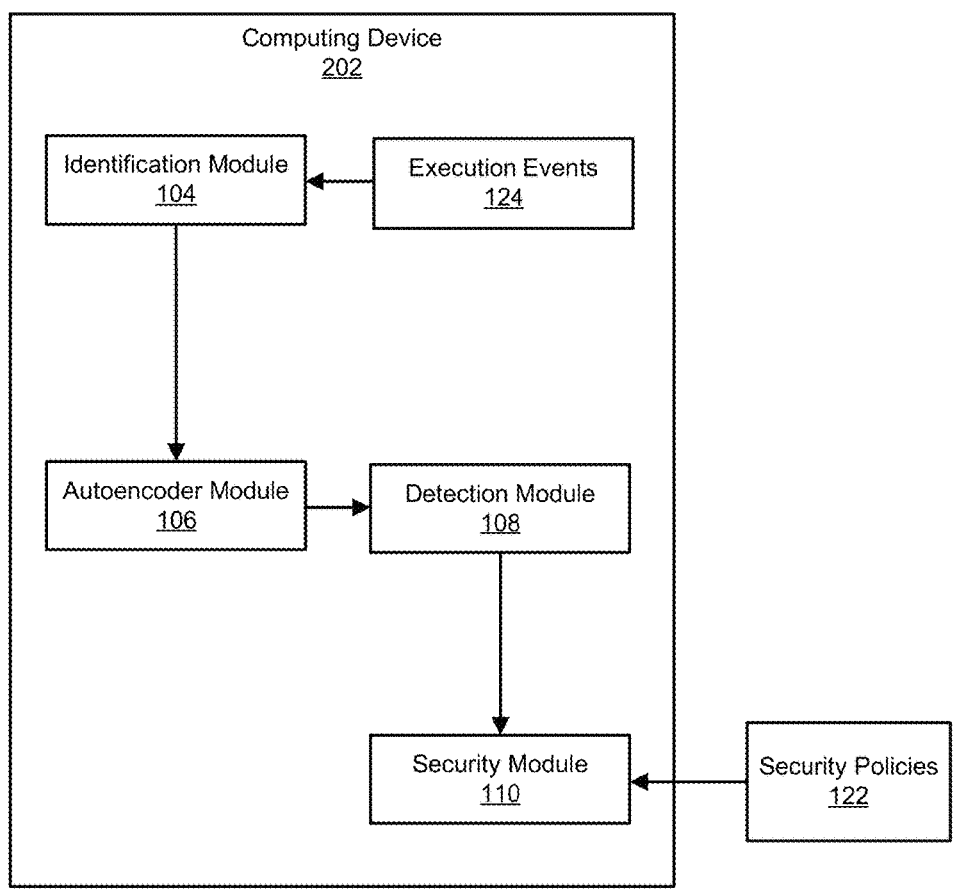
FIG. 4 is a block diagram of an example computing device for detecting anomalous behavior within computing sessions.
Figure 5:
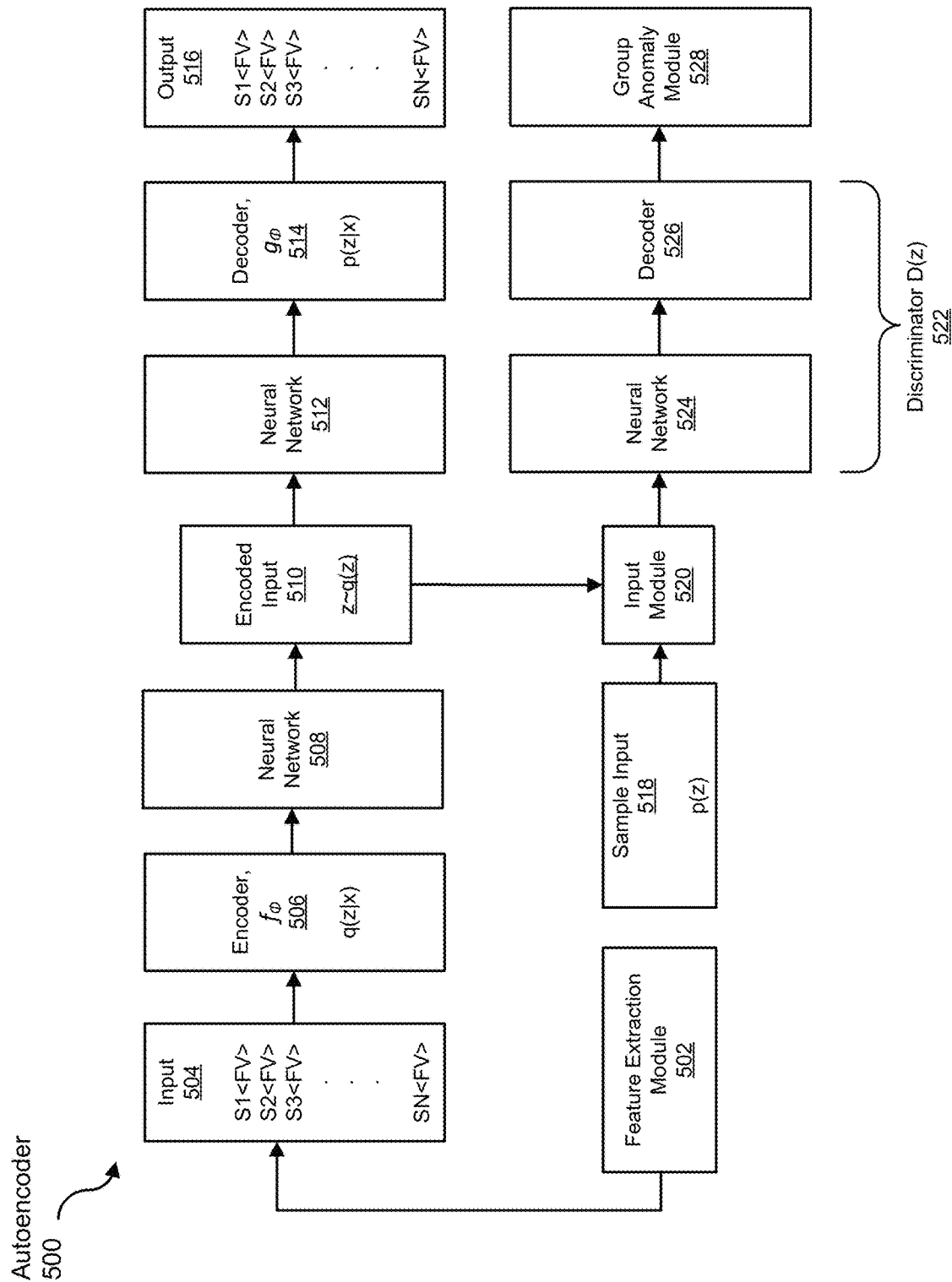
FIG. 5 is a block diagram of an example autoencoder module.
Figure 6:
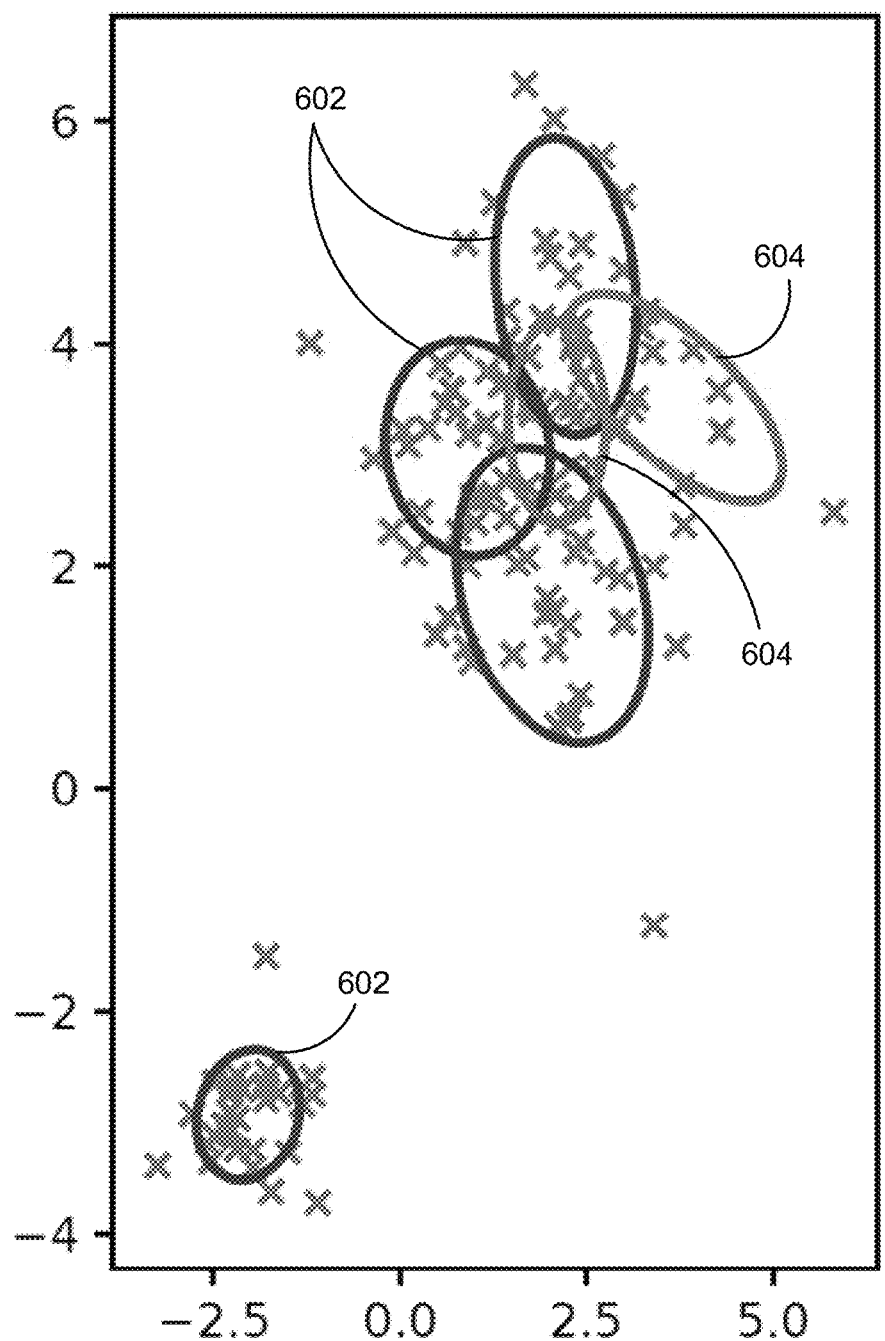
FIG. 6 is a graph of an example group anomaly detection.
Figure 7:
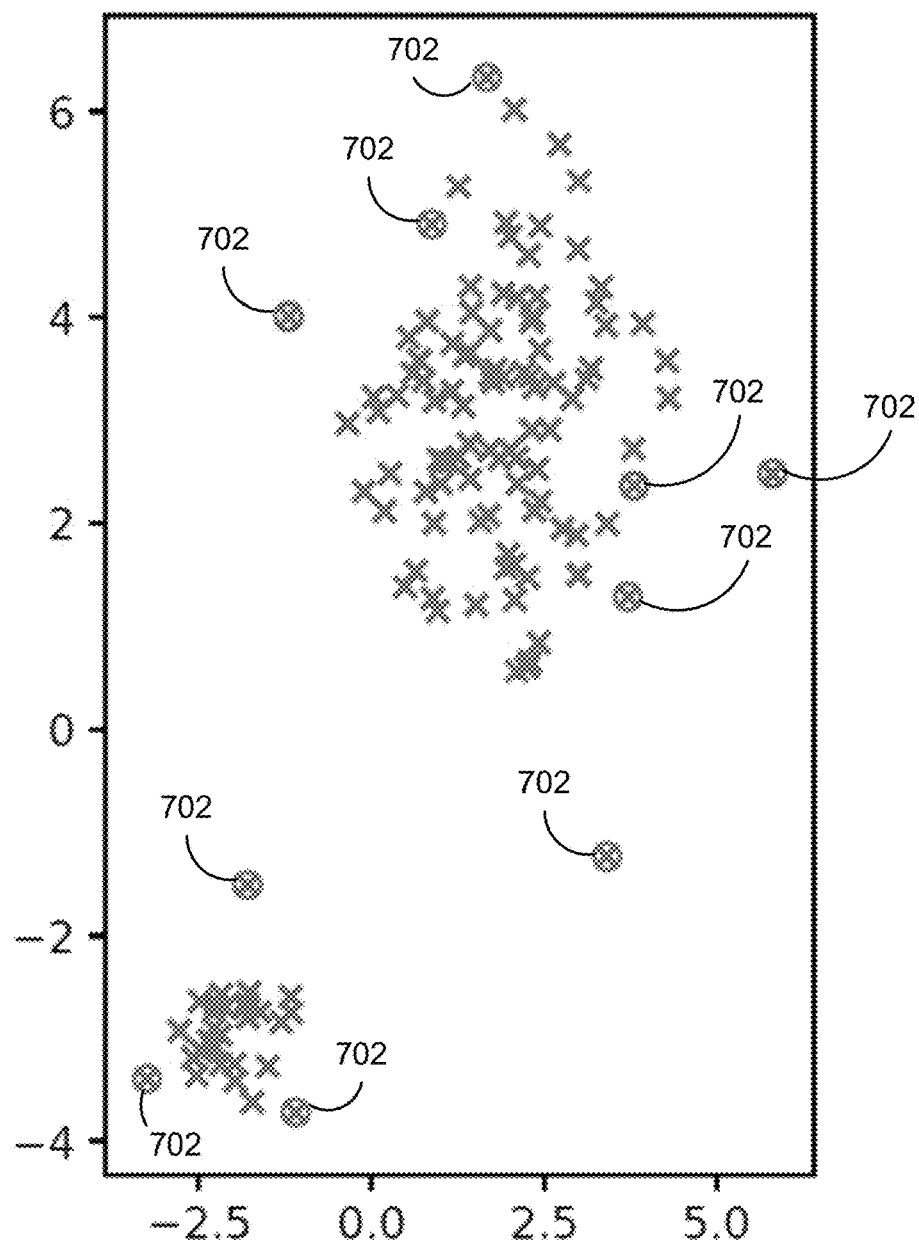
FIG. 7 is a graph of an example point anomaly detection.

The systems and methods described herein may improve the functioning of a computing device by detecting potentially malicious executions of software and/or software tools that would otherwise go undetected. For example, the systems and methods described herein may employ security policies that may be used to identify, quarantine, or otherwise address software and/or software tools that are exhibiting anomalous and potentially malicious behavior. One advantage provided my such systems may be preventing unauthorized access to certain files stored on a computing device, preventing malicious encryption of files stored on a computing device, preventing credential bumps (e.g., password theft), etc. The systems and methods presented herein may also provide a variety of other features and advantages over traditional systems, The following will provide, with reference to FIGS. 1-2, detailed descriptions of example systems for detecting anomalous behavior within computing sessions. Detailed descriptions of corresponding computer-implemented methods will also be provided in connection with FIG. 3. A detailed description of data flow through the example system for detecting anomalous behavior within computing sessions will also be provided in connection with FIG. 4. A detailed description of an example autoencoder that may be used in any of the embodiments herein will also be provided in connection with FIG. 5. FIGS. 6-7 illustrate example graphs of anomalous behavior that may be provided by any of the embodiment herein. In addition, detailed descriptions of an example computing system and network architecture capable of implementing one or more of the embodiments described herein will be provided in connection with FIGS. 8 and 9, respectively.

FIG. 1 is a block diagram of an example system 100 for detecting anomalous behavior within computing sessions. As illustrated in this figure, example system 100 may include one or more modules 102 for performing one or more tasks. As will be explained in greater detail below, modules 102 may include an identification module 104, an autoencoder module 106, a detection module 108, and a security module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting anomalous behavior within computing sessions. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include data storage 120. Data storage 120 generally represents any type of form of computing device capable of data storage. In one example, data storage 120 may store security policies 122, execution events 124, and attack behavior database 126. Some examples of data storage 120 include, without limitation, hard disk drives (HDDs) and solid state storage devices (SSDs).

Figure 2:
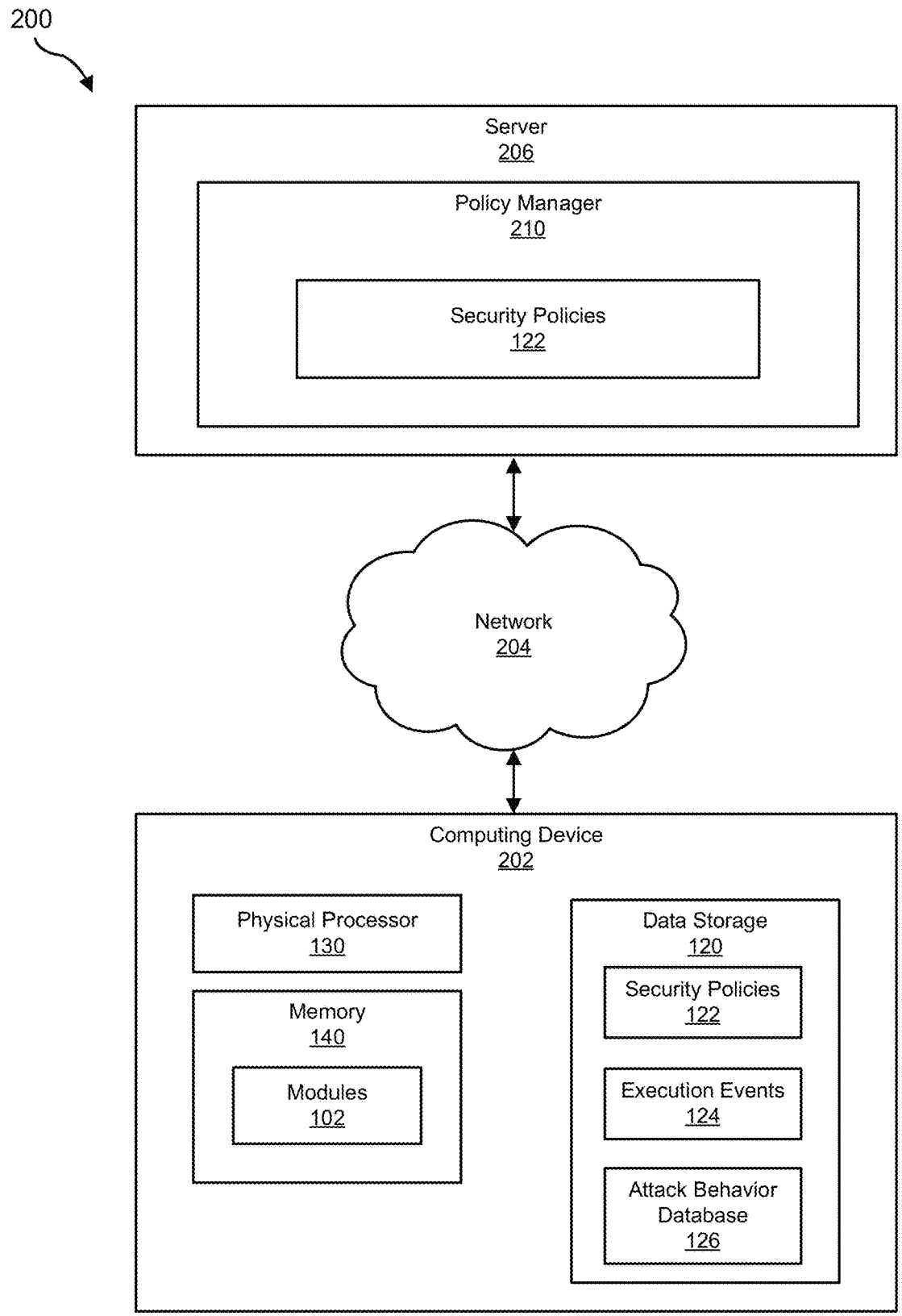
FIG. 2 is a block diagram of an additional example system for detecting anomalous behavior within computing sessions.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detect anomalous behavior within computing sessions. For example, and as will be described in greater detail below, one or more of modules 102 may cause computing device 202 and/or server 206 to identify a set of execution events 124 that correspond to a computing session, provide the set of execution events as input to an autoencoder (e.g., autoencoder 106 of FIG. 1), receive, from the autoencoder, a reconstruction error associated with auto-encoding the set of execution events, detect, based on the reconstruction error, an anomaly within the computing session, and perform a security action to address the anomaly within the computing session.

Computing device 202 generally represents any type or form of computing device capable of reading computer-executable instructions. For example, computing device 202 may include an endpoint device (e.g., a system administrator workstation) running network security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading computer-executable instructions. In one example, the server 206 may represent a server capable of hosting a policy manager 210 to facilitate enforcement of security policies 122 for the computing device 202 to detect anomalous behavior within computing sessions. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
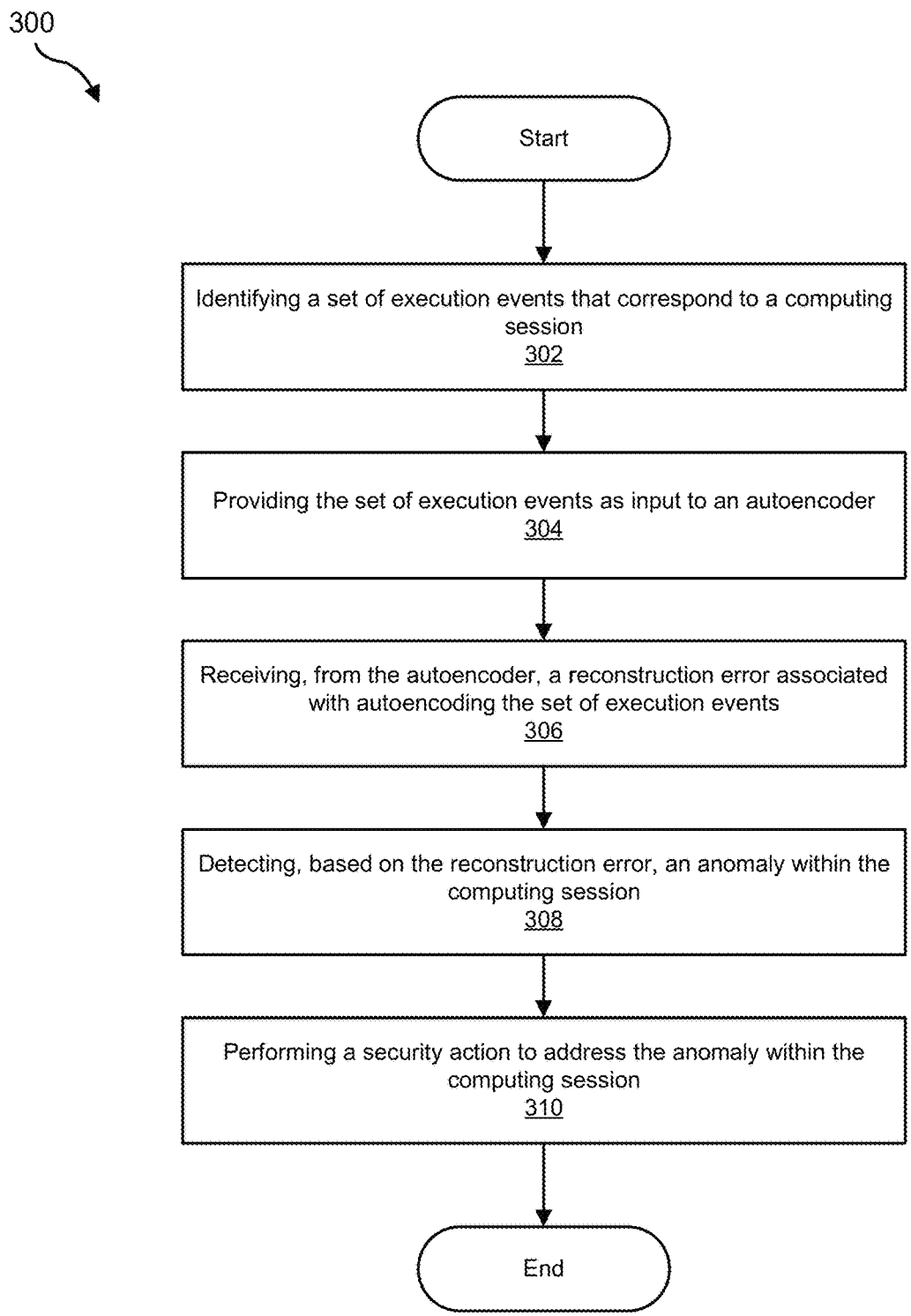
FIG. 3 is a flow diagram of an example method for detecting anomalous behavior within computing sessions.

FIG. 3 is a flow diagram of an example computer-implemented method 300 for detecting anomalous behavior within computing sessions. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify a set of execution events that correspond to a computing session. The systems described herein may identify the set of execution events in any suitable manner. For example, identification module 104, as part of computing device 202 in FIG. 2, may monitor one or more computing devices to identify executions of software tools and applications running on the computing devices. Thus, when a user initiates a computing session on a computing device, identification module 104 may identify behavior of the software tools and applications as part of an initial detection process for identifying anomalous activity within the computing session. These behaviors may be recorded as a set of one or more execution events and may include a variety of items such as, for example, computing session IDs and durations, command line executions of software tools and applications, registry value changes, processes executed, and the like. In one example, command line executions may include strings of text pertaining to the initialization, implementation, and/or operation of the software tools and applications on the computing devices.

As used herein, the term "computing session" may generally refer to any interactive information interchange between a computer and user and/or between two or more computing devices. Computing sessions may be established at a certain point in time and may be terminated at some later point in time. A computing session may be user- or device-initiated and may be identified using a session ID or other unique identifier.

Identification module 104 may collect the set of execution events in any suitable manner. In some embodiments, identification module 104 may collect the set of execution events from any number of computing systems. For example, identification module 104 may identify execution events from a single computing system, from all computing systems within a division of an enterprise, from all computing systems within an enterprise (e.g., thousands of endpoints), from all computing systems associated with a particular user, etc. Similarly, identification module 104 may collect execution events during any suitable period of time (e.g., one or more hours, days, months, etc.).

At step 304, one or more of the systems described herein may provide the set of execution events as input to an autoencoder, such as autoencoder module 106 of FIG. 1. The system may provide the set of execution events as input to the autoencoder in any suitable manner. For example, autoencoder module 106 may prepare information collected by identification module 104 for evaluation by an autoencoder. In some embodiments, autoencoder module 106 may group raw events by session ID and then may extract features from the raw event data. Autoencoder module 106 may extract or identify a variety of features associated with events. These features may include machine and/or customer identifiers, static features of binaries or processes, parent-child relationships of processes executed, reputation and/or prevalence of a file or process within an enterprise, command lines executed by a process and/or file, file names and/or directories, timestamps of activities, and/or other low-level behaviors. As described in more detail below, these extracted features may be feed into an autoencoder.

In one example, an autoencoder may be a type of artificial neural network operable to learn efficient data encodings in an unsupervised manner (e.g., instead of responding to feedback, the autoencoder learns by identifying commonalities in data and reacting based on the presence or absence of such commonalities in each subsequent piece of new data). Generally, an autoencoder learns a representation (e.g., an encoding) for a set of data, typically for dimensionality reduction. Then, the autoencoder may generate, from the reduced encoding, a representation (e.g., a decoding) as close as possible to its original input. An autoencoder may be implemented in various ways using various systems and devices described herein. In one example, an autoencoder may include an adversarial autoencoder ("AAE", e.g., a probabilistic autoencoder) that uses generative adversarial networks (GANs) to perform variational inference by matching an aggregated posterior of a hidden code vector of the autoencoder with an arbitrary prior distribution of data. In such an example, the AAE may match the aggregated posterior of data to the prior distribution of data to generate meaningful samples from any part of prior space of data. As a result, a decoder of the AAE may learn a deep generative model that maps the imposed prior distribution of data to the input data distribution.

At step 306, one or more of the systems described herein may receive, from the autoencoder, a reconstruction error associated with autoencoding the set of execution events (e.g., a reconstruction error associated with autoencoding the features extracted from or associated with the execution events). The system may receive the reconstruction error in any suitable manner. In one example, when the autoencoder encodes the input set of execution events, the autoencoder may decode the encoded set of execution events to reconstruct the original input of the set of execution events. Generally, there is some error during this reconstruction process because, among other reasons, the decoder of the autoencoder learns the input set of execution events from a hidden code vector formed by a hidden neural network of the encoder portion of the autoencoder. Thus, a reconstruction error as used herein is any error between an originally encoded input set of execution events and the decoded output set of execution events determined by one or more systems described herein.

At step 308, one or more of the systems described herein may detect, based on the reconstruction error, an anomaly within the computing session. The system may detect the anomaly within the computing session in any suitable manner. In one example, the reconstruction error may indicate whether uses of the software tools and applications of a computing session are legitimate or malicious. For example, a smaller reconstruction error may indicate that a command line execution has a legitimate purpose as the decoder of the autoencoder is able to find commonalities in the command line execution with other typical command line executions. A larger reconstruction error, on the other hand, may indicate that a command line has a malicious purpose as the decoder of the autoencoder may find fewer commonalities in the command line execution with other typical command line executions. Thus, the system may classify command line executions with larger reconstruction errors as anomalous and potentially malicious.

At step 310, one or more systems described herein may perform a security action to address the anomaly within the computing session. The system may perform the security action in any suitable manner. In some examples, detection module 108 may score the reconstruction errors and group the reconstruction errors based on the scores so as to group the anomalous activity according to computing session ID. In some examples, security module 110 may receive, from detection module 108, this grouping of anomalous activity to perform one or more security actions.

In one example, the security action may include applying a security policy 122. In some examples, security module 110 may obtain one or more security policies 122 from the data storage 120 of computing device 202. If security module 110 determines that the security policies 122 do not exist in data storage 120 or are out of date (e.g., last synchronization with the server 206 exceeds a predetermined time period), the security module 110 may query a policy manager, such as policy manager 210, to obtain one or more security policies 122. The policy manager 210 may manage one or more security policies 122 associated the computing device 202. In some examples, security policies 122 may include a policy that includes instructions to identify and/or terminate potentially malicious execution events during a computing session. In some examples, security module 110, may obtain the security policy and may store the security policy 122 locally, such as in data storage 120.

In some embodiments, the security action may involve notifying an administrator or other user of potential anomalies. For example, security module 110 may identify group and/or pointwise anomalies and may send a report with information about these anomalies to a security administrator.

In one example, the system may employ group anomaly detection to identify groups of software behaviors that deviate from typical behavior. For example, an individual computing session may be modeled as a group, and execution activity (e.g., execution events 124 of FIG. 1) occurring in the computing session may be attributed to group behaviors. In this regard, deep-learning embedding models may be employed for feature extraction of command line executions during the computing session.

To illustrate, low-level software behaviors observed on an endpoint computing device may be mapped to a set of high-level behaviors of MITRE ATT&CK tactics (see e.g., https://attack.mitre.org/), stored or otherwise maintained in attack behavior database 126 of FIG. 1. This mapping may then be used as features to build the deep-learning embedding models. The following table (Table 1) shows some examples of MITRE ATT&CK tactics.

TABLE 1

| High level Behaviors | Tactic |
|---|---|
| Bits Admin activity | BITSJobs |
| Command launches by msiexe, WMI, powershell, network activity by command line | Command-LineInterface |
| Memory access of LSASS, CryptDll | CredentialDumping and LSASSDriver |
| Query for Security tools, Registry changes to trusted process | DisablingSecurityTools |
| Password dumping and Key logging activity | ExploitationforCredentialAccess |
| Random folder creation, Proxy changes, Registry and startup folder changes | HiddenFilesandDirectories |
| WMIC activity | WMIC |
| WScript runs, Powershell launches other process | Scripting |
| Build tools, script execution by common tools with network traffic | TrustedDeveloperUtilities |
| Scheduled tasks added or launched | ScheduledTask |
| Process injections with network activity | ProcessInjection |
| Client tools with network activity other than browsers | ExploitationforClientExecution |

In one example, a modified "continuous bag of words" model may be used to obtain a textual (e.g., a semantic) representation of command lines and low-level software behaviors observed during a computing session. Generally, a continuous bag of words model is a simplifying representation used in natural language processing and information retrieval. For example, text, such as that found in a sentence, may be represented as a "bag" (multiset) of its words, disregarding grammar and word order while keeping multiplicity.

In one example, the model may be viewed as a fully connected neural network with one hidden layer (e.g., linear activation). The size of the hidden layer generally corresponds to a dimensionality of a final text representation. Input and output layers of the neural network generally have the same number of neurons as the vocabulary size. A weight matrix between the input and the hidden layer may yield a textual representation. The neural network generally tries to learn the representation of each word by looking at surrounding words in the sentence.

In one example, the model may learn text embeddings of words, n-grams, and uni-grams in the sentence in order to obtain a textual representation a target word. A textual representation of a sentence is generally the average of the text embeddings of its constituent n-grams and uni-grams. An n-gram is generally a contiguous sequence of "n" number of items from a given sample of text. For example, in the string of text "Joe says hello to Bob", there is one instance each of the n-grams "Joe", "says", "hello", "to", and "Bob", there is one instance of each of the uni-grams "J", "a", "y", "h", "B", "b", "t", there are two instances each of the uni-grams "e", "s", and "l", and there are four instances each of the uni-grams "o" and space. Thus, the string may be represented numerically as [1, 1, 1, 1, 1, 1, 1, 1, 1, 1, 1, 2, 2, 2, 4, 4]. In one example of a command line execution, the model may represent the command line execution string of "CSIDL_DRIVE_FIXED\program files (x86)\microsoft office\office14\winword.exe/n CSIDL_PROFILE\appdata\local\temp\inv-9e7625.doc" as "[8, 13, 16, 15, 1, 3, 18, 4, 14, 5, 9, 8, 2, 10, 7, 11, 6, 17, 12]."

The system may extract high-level behaviors, such as those listed in Table 1, from low-level software activity obtained during a computing session. The system may then sort the behaviors by computing session ID to create a sequence of command line execution activity. The sequence of command line execution activity may then be used to train the model and obtain a numerical representation of the sequence, similar to the above numerical representation of the command line execution string. Then, the system may input the numerical representation of the command line execution activity into an autoencoder, such as autoencoder module 106 of FIG. 1.

One example of the autoencoder is now discussed with reference to example autoencoder 500 of FIG. 5. Autoencoder 500 may be operable to reconstruct an input 504 of a sequence of command line execution activity. First, a feature extraction module 502 may extract high-level behaviors, such as those listed in Table 1, from low-level software activity obtained during a computing session to generate a sequence of command line execution events sorted by computing session ID as input 504 to autoencoder 500. For example, S1<FV> may be a numerical representation of a command line execution of computing session ID "S1", S2<FV> may be a numerical representation of a command line execution of computing session ID "S2", S3<FV> may be a numerical representation of a command line execution of computing session ID "S3", . . . , and SN<FV> may be a numerical representation of a command line execution of computing session ID "SN", where the reference "N" represents an integer greater than "1" and not necessarily equal to any other "N" reference designated herein.

An encoder, $f_\Phi$, 506 of autoencoder 500 may encode the sequence as $q(z|x)$ and a hidden neural network 508 may embed the encoded sequence into a latent (e.g., hidden) representation $f_\Phi(z|G_m)$ to generate an encoded input 510, $z \sim q(z)$. A decoder, $g_\Phi$, 514 of autoencoder 500 may receive encoded input 510, $z \sim q(z)$, through another hidden neural network 512 to decode the sequence as $p(z|x)$ and reconstruct the original input 504 as the sequence of command line execution events sorted by computing session ID (e.g., output 516 of S1<FV>, S2<FV>, S3<FV>, . . . , SN<FV>).

In some examples, a reconstruction loss may occur during the reconstruction of input 504. The reconstruction loss may be defined as the squared error between an input $G_m$ and an output $\hat{G}_m$ given by:

$$L_r(G_m, \hat{G}_m) = \|G_m - \hat{G}_m\|^2, \text{ where } G_m \in \mathbb{R}^{N \cdot V} \qquad \text{Equation I.}$$

Weights of encoder, $f_\Phi$, 506 and decoder, $g_\Phi$, 514 may be updated by back propagating the reconstruction loss $L_r$.

In some examples, autoencoder 500 may be an adversarial autoencoder that uses adversarial learning to learn a broader set of distributions as priors for latent code. In this regard, autoencoder 500 may include a discriminator 522 configured from another hidden neural network 524 and another decoder 526. Discriminator 522 may receive z distributed as $f_\Phi(z|G_m)$ and z' sampled from a true prior $p(z)$ (e.g., sample input 518) to compute a score assigned to each D(z) and D(z'). For example, autoencoder 500 may add true prior $p(z)$ of sample input 518 to input module 520 of autoencoder 500 and subtract encoded input 510 therefrom to provide input to hidden neural network 524. Decoder 526 of discriminator 522 may then decode the input sequence from hidden neural network 524 to reconstruct the true prior $p(z)$ of sample input 518.

Generally, any loss incurred may be minimized by back-propagating through discriminator 522 to update its weights. The loss function $L_G$ for autoencoder 500 may include the reconstruction error as well as the loss function $L_G$ for discriminator 522, as follows:

$$L_G = \frac{1}{M'} \sum_{m=1}^{M'} \log D(z_m),$$ Equation II and $$L_D = -\frac{1}{M'} \sum_{m=1}^{M'} [\log D(z'_m) + \log(1 - D(z_m))],$$ Equation III where M' is a minibatch size, z represents the latent code generated by encoder 506, and z' is a sample from the true prior p(z) (e.g., sample input 518).

To group anomalous activity, autoencoder 500 employ group anomaly module 528. Group anomaly module 528 may observe a set of groups $G=\{G_m\}_{m=1}^{M}$, where the $m^{th}$ group generally includes $N_m$ observations as follows:

$$G_m = (X_{ij}) \in \mathbb{R}^{N_m \cdot V},$$ Equation IV.

where the total number of individual observations is generally $\Sigma_{m=1}^{M} N_m$. A group reference may be the composition of characterization and aggregation features on the input groups as follows:

$$G^{(ref)} = g[\{f(G_m)\}_{m=1}^{M}].$$ Equation V.

Then, group anomaly module 528 may compute a distant metric d( . . . )≥0 to determine a deviation of a particular group from other groups. A distance score $d(G^{(ref)}, G_m)$ may quantify the deviance of the $m^{th}$ group from an expected group pattern where larger values are associated with more anomalous groups. Group anomaly module 528 may use this measurement to quantify the deviance of a particular group from expected group patterns where groups with the highest anomalous scores may be examined. Distant scores may then be converted into classification labels based on a predetermined threshold. Group anomalies may then be detected when the characterization function f and the aggregation function g capture properties of group distributions and appropriately combine information into a group reference.

Autoencoder 500 may be trained according to the objective function given of Equation II and III. The objective function may be optimized using a back-propagation algorithm. Given known group memberships, autoencoder 500 may be trained on input groups to obtain a representative group reference $G^{(ref)}$ from Equation V.

In order to identify group anomalies, group anomaly module 528 may compute the distance of a group from the group reference $G^{(ref)}$ such that output scores may be sorted according to descending order, where groups that are furthest from the group reference $G^{(ref)}$ are considered anomalous.

To illustrate, group anomaly module 528 may use an input of Groups $G=\{G_m\}_{m=1}^{M}$, where $G_m=(X_{ij})\in\mathbb{R}^{N_m \cdot V}$. Group anomaly module 528 may output group anomaly scores S for input groups G as follows:

i. draw a random latent representation $z-f_\phi(z|G)$
ii. reconstruct sample using decoder 526 $G^{(ref)}=g_\psi(G|z)$
iii. for (m=1 to M) do:
compute the score $s_m=d(G^{(ref)}, G_m)$
iv. sort scores in descending order $S=\{s_{(M)} > \ldots s_{(1)}\}$
v. identify groups that are furthest from $G^{(ref)}$ as anomalous.
vi. return S and present groups, both legitimate and anomalous, according to session ID.

Figure 8:
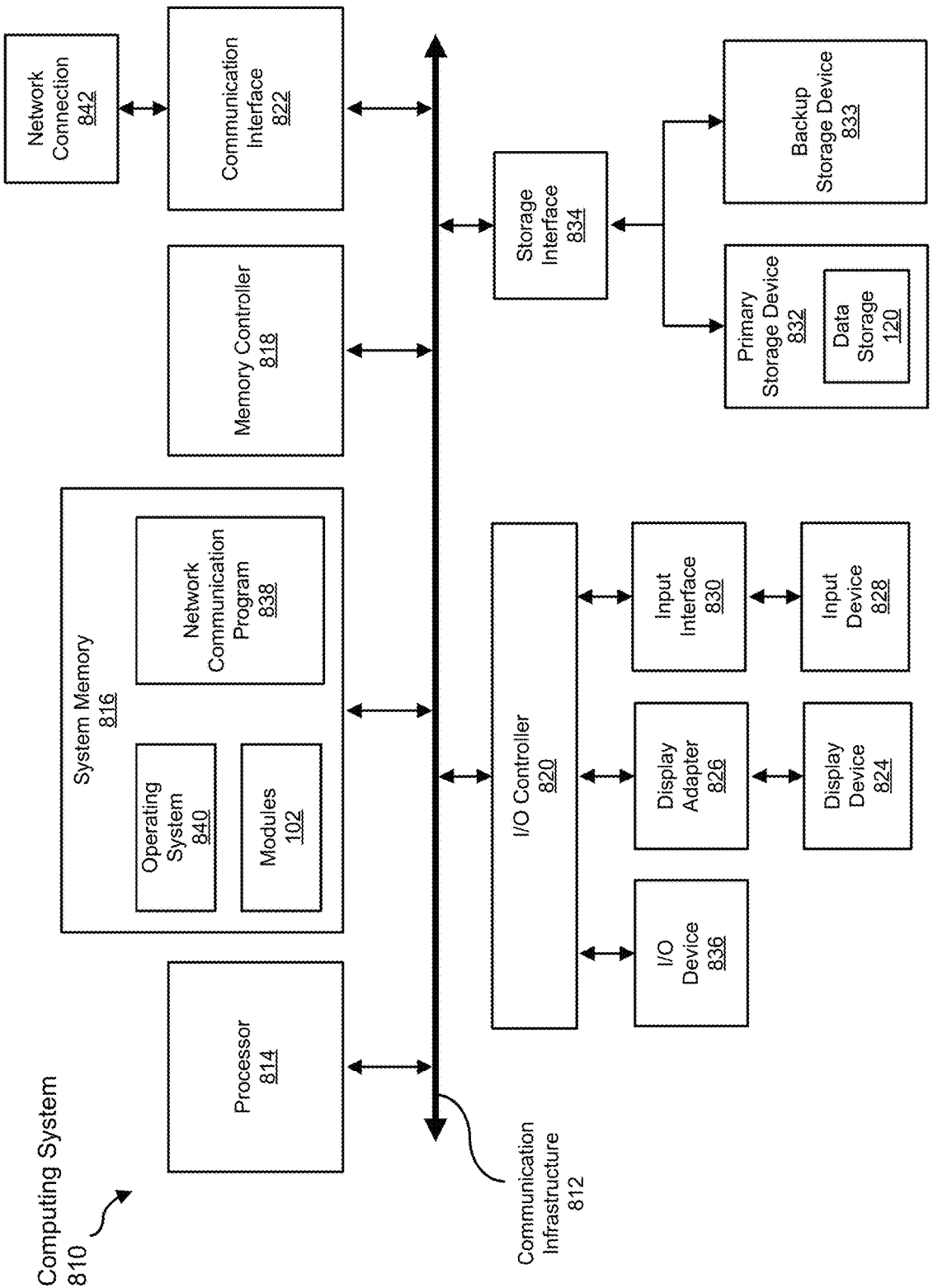
FIG. 8 is a block diagram of an example computing system capable of implementing one or more of the embodiments described and/or illustrated herein.

FIG. 8 illustrates an example of a group anomaly detection of attacker activity in graph 800. In this example, a total of six computing sessions is observed on an endpoint computing device. Row-wise distributions generally represent command line execution activity (e.g., attacker activity and legitimate activity) occurring during column-wise computing sessions (arranged by computing session ID) on an endpoint computing device. Four of the behaviors 802 are grouped as normal behaviors. And, two of the behaviors 804 are grouped as anomalous activity that deviates from the normal behaviors. In some examples, such behaviors 804 may include actual attack activity, pen testing activity (i.e., penetration testing), or the like.

In some examples, the system may also employ point-wise detection of anomalous activity. For example, at least a portion of security policies 122 may be rules-based and include partial matching functions to compare commands being used during a computing session to commands that have been used in previous attacks to identify similarities. Such may be useful in additionally capturing anomalous and/or malicious behavior outside of grouped attacks. FIG. 7 illustrates an example of point-wise anomaly detection of attacker activity in graph 700 represented by anomalous detections 702.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, additional elements, such as data storage 120 of FIG. 1 may be stored and/or loaded in primary storage device 8832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
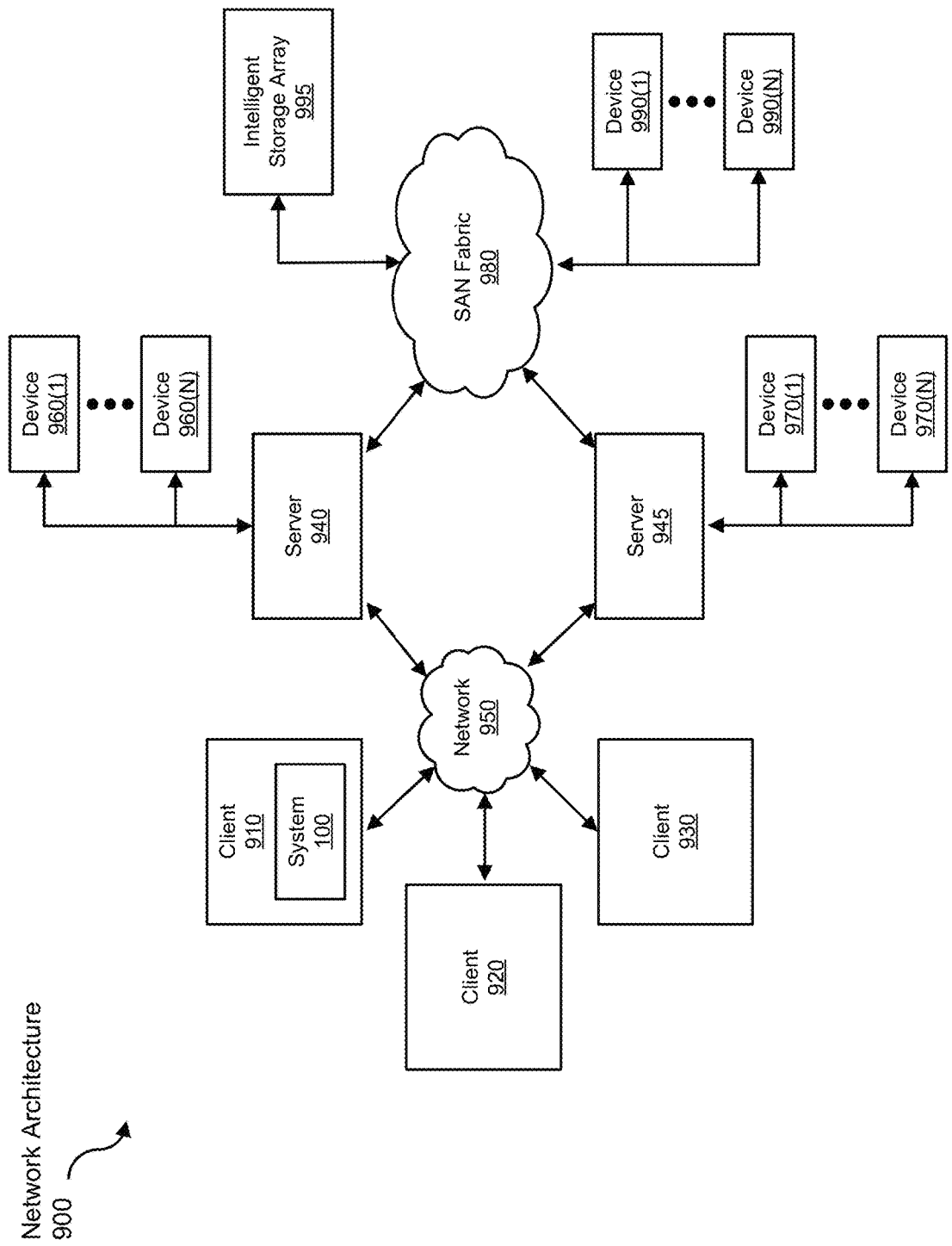
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data pertaining to a plurality of execution events, such as command line executions of software and/or software tools. One or more of the modules described herein may convert the data into numerical representations for encoding by an auto encoder and subsequently decoded by the autoencoder for reconstruction of the numerical representations of the execution events. The reconstructions may result in errors that may be used to identify anomalous and potentially malicious use of the software and/or software tools. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting anomalous behavior within computing sessions, at least a portion of the method being performed by a computing device comprising at least one processor, the method comprising:
   identifying, by the computing device, a set of execution events that correspond to a computing session;
   providing, by the computing device, the set of execution events as input to an autoencoder;
   receiving, by the computing device and from the autoencoder, a reconstruction error associated with autoencoding the set of execution events;
   detecting, by the computing device and based on the reconstruction error, an anomaly within the computing session; and
   performing, by the computing device, a security action to address the anomaly within the computing session.

2. The computer implemented method of claim 1, further comprising:
   receiving, by the computing device and from the autoencoder, another reconstruction error associated with autoencoding the set of execution events;
   detecting, by the computing device and based on the other reconstruction error, another anomaly within the computing session; and
   grouping, by the computing device, the anomalies according to the set of execution events and the computing session.

3. The computer implemented method of claim 2, further comprising:
   decoding, by the computing device and by the autoencoder, the autoencoded set of execution events to reconstruct the set of execution events; and
   comparing, by the computing device and by the autoencoder, the autoencoded set of execution events to the reconstructed set of execution events to determine the reconstruction errors.

4. The computer implemented method of claim 2, wherein:
   the autoencoder comprises an adversarial autoencoder.

5. The computer implemented method of claim 4, further comprising:
   updating, by the computing device and by the adversarial autoencoder, weights of a discriminator of the adversarial autoencoder based on the reconstruction errors.

6. The computer implemented method of claim 1, wherein:
   the set of execution events includes strings of text from command line executions; and
   the method further comprises, by the computing device, extracting n-grams from the text as at least part of the input to the autoencoder.

7. The computer implemented method of claim 1, further comprising:
   mapping, by the computing device, behaviors of a plurality of software applications to a database of malicious uses of the software applications to form at least a part of the set of execution events.

8. A system for detecting anomalous behavior within computing sessions, the system comprising:
   at least one physical processor; and
   physical memory comprising computer-executable instructions that, when executed by the physical processor, cause the physical processor to:
   identify a set of execution events that correspond to a computing session;
   provide the set of execution events as input to an autoencoder;
   receive, from the autoencoder, a reconstruction error associated with autoencoding the set of execution events;
   detect, based on the reconstruction error, an anomaly within the computing session; and
   perform a security action to address the anomaly within the computing session.

9. The system of claim 8, wherein the computer-executable instructions further cause the physical processor to:

receive, from the autoencoder, another reconstruction error associated with autoencoding the set of execution events;

detect, based on the other reconstruction error, another anomaly within the computing session; and group the anomalies according to the set of execution events and the computing session.

10. The system of claim 9, wherein the computer-executable instructions further cause the physical processor to:

decode, by the autoencoder, the autoencoded set of execution events to reconstruct the set of execution events; and compare, by the autoencoder, the autoencoded set of execution events to the reconstructed set of execution events to determine the reconstruction errors.

11. The system of claim 9, wherein:

the autoencoder comprises an adversarial autoencoder.

12. The system of claim 11, wherein the computer-executable instructions further cause the physical processor to:

update, by the adversarial autoencoder, weights of a discriminator of the adversarial autoencoder based on the reconstruction errors.

13. The system of claim 8, wherein:

the set of execution events includes strings of text from command line executions; and the computer-executable instructions further cause the physical processor to extract n-grams from the text as at least part of the input to the autoencoder.

14. The system of claim 8, wherein the computer-executable instructions further cause the physical processor to:

map behaviors of a plurality of software applications to a database of malicious uses of the software applications to form at least a part of the set of execution events.

15. A non-transitory computer-readable medium comprising one or more computer-executable instructions that, when executed by at least one processor of a computing device, cause the computing device to:

identify a set of execution events that correspond to a computing session;

provide the set of execution events as input to an autoencoder;

receive, from the autoencoder, a reconstruction error associated with autoencoding the set of execution events;

detect, based on the reconstruction error, an anomaly within the computing session; and perform a security action to address the anomaly within the computing session.

16. The non-transitory computer-readable medium of claim 15, wherein the computer-executable instructions further cause the computing device to:

receive, from the autoencoder, another reconstruction error associated with autoencoding the set of execution events;

detect, based on the other reconstruction error, another anomaly within the computing session; and group the anomalies according to the set of execution events and the computing session.

17. The non-transitory computer-readable medium of claim 16, wherein the computer-executable instructions further cause the computing device to:

decode, by the autoencoder, the autoencoded set of execution events to reconstruct the set of execution events; and compare, by the autoencoder, the autoencoded set of execution events to the reconstructed set of execution events to determine the reconstruction errors.

18. The non-transitory computer-readable medium of claim 16, wherein:

the autoencoder comprises an adversarial autoencoder; and the computer-executable instructions further cause the computing device to:

update, by the adversarial autoencoder, weights of a discriminator of the adversarial autoencoder based on the reconstruction errors.

19. The non-transitory computer-readable medium of claim 15, wherein:

the set of execution events includes strings of text from command line executions; and the computer-executable instructions further cause the computing device to:

extract n-grams from the text as at least part of the input to the autoencoder.

20. The non-transitory computer-readable medium of claim 15, wherein the computer-executable instructions further cause the computing device to:

map behaviors of a plurality of software applications to a database of malicious uses of the software applications to form at least a part of the set of execution events.

* * * * *